United States Patent
Nagura et al.

(10) Patent No.: US 8,919,719 B2
(45) Date of Patent: Dec. 30, 2014

(54) VEHICLE SEAT SLIDING DEVICE

(75) Inventors: Mikihito Nagura, Okazaki (JP); Satoshi Masuda, Kariya (JP); Motoharu Yoshii, Kariya (JP); Toshihiro Kimura, Toyota (JP); Ryousuke Mizuno, Novi, MI (US)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 14/241,513

(22) PCT Filed: Jun. 21, 2012

(86) PCT No.: PCT/JP2012/065903
§ 371 (c)(1),
(2), (4) Date: Feb. 27, 2014

(87) PCT Pub. No.: WO2013/035413
PCT Pub. Date: Mar. 14, 2013

(65) Prior Publication Data
US 2014/0224955 A1 Aug. 14, 2014

(30) Foreign Application Priority Data
Sep. 6, 2011 (JP) .................................. 2011-194124

(51) Int. Cl.
*F16M 13/00* (2006.01)
*B60N 2/07* (2006.01)

(52) U.S. Cl.
CPC ............ *B60N 2/0722* (2013.01); *B60N 2/0705* (2013.01); *B60N 2/0715* (2013.01); *B60N 2/0725* (2013.01)
USPC .... 248/429; 248/424; 297/344.11; 296/65.13

(58) Field of Classification Search
CPC ...... B60N 2/07; B60N 2/0722; B60N 2/0715; B60N 2/0727; B60N 2/0725
USPC ............ 248/429, 424; 296/65.13; 297/344.11
See application file for complete search history.

(56) References Cited

U.S. PATENT DOCUMENTS

| 7,594,635 B2 * | 9/2009 | Kojima et al. ................. 248/429 |
| 2008/0238168 A1 | 10/2008 | Kojima et al. |

FOREIGN PATENT DOCUMENTS

| JP | 2002-192994 A | 7/2002 |
| JP | 2004-359072 A | 12/2004 |
| JP | 2008-265723 A | 11/2008 |

OTHER PUBLICATIONS

U.S. Appl. No. 14/241,522, filed Feb. 27, 2014, Nagura, et al.
English translation of the International Preliminary Report on Patentability and Written Opinion issued Mar. 12, 2014 in PCT/JP2012/065903.

* cited by examiner

*Primary Examiner* — Todd M Epps
(74) *Attorney, Agent, or Firm* — Oblon, Spivak, McClelland, Maier & Neustadt, L.L.P.

(57) ABSTRACT

A vehicle seat sliding device includes: a lower rail adapted to be fixed to a vehicle floor; and an upper rail adapted to be fixed to a vehicle seat, and coupled with the lower rail in a relatively movable manner. A projection is arranged in the vicinity of the rear end portion of the lower rail, and protrudes above the bottom wall of the lower rail. A fitting recess is formed in the bottom wall more forward than the projection. A block body placed on the bottom wall extends to the projection and has a slanted surface more forward than the projection. The block body includes: a fitting protrusion, which fits into the fitting recess and positions the block body in the lateral direction; and a fitting wall, at least a part of which fits on the protrusion. The fitting wall positions the block body in the lateral direction.

8 Claims, 4 Drawing Sheets

VEHICLE SEAT SLIDING DEVICE

FIELD OF THE INVENTION

The present invention relates to a vehicle seat sliding device.

BACKGROUND OF THE INVENTION

Patent Document 1 describes an example of a known vehicle seat sliding device. The device includes two lower rails, two upper rails, and a block body. Each of the upper rails is coupled with a corresponding one of the lower rails in a movable manner. The block body prevents a foreign object that has entered the rails from being entrapped. A bolt for fixing each lower rail to a vehicle floor is provided rearward from the block body. The block body, which is arranged on a bottom wall of the lower rail, has a slanted surface that gradually rises toward the bolt. When a foreign object enters the rails in front of the block body, as the upper rail moves toward the rear, the foreign object is pushed and moved by the upper rail. This gradually raises the foreign object along the slanted surface of the block body. Accordingly, the foreign object pushed by the upper rail passes over a head of the bolt, which is arranged rearward from the block body. This prevents the foreign object from being entrapped between the upper rail and the head of the bolt.

PRIOR ART DOCUMENT

Patent Document

Patent Document 1
Japanese Laid-Open Patent Publication No. 2008-265723

SUMMARY OF THE INVENTION

In the seat sliding device of Patent Document 1, fitting portions of the block body are fitted into two notched portions formed in the two lateral sides of the bottom wall of the lower rail. Further, the block body is held between two bent pieces formed in the two lateral sides of the bottom wall in correspondence with the location of the notched portions. In such a configuration, however, when the block body is coupled to the lower rail, although the block body is prevented from being separated from the lower rail, backlash of the block body in the lateral direction of the lower rail cannot be sufficiently limited. This is because the location that reduces backlash of the block body in the lateral direction is centered at the location of the bent pieces. In particular, when the block body is shaped such that it significantly extends rearward from the location of the bent pieces due to the relationship of the spacing between the bent pieces and the bolt located rearward from the bent pieces, the backlash in the lateral direction further increases at the rear end of the block body. In this case, the block body when displaced in the lateral direction may interfere with the upper rail that moves rearward.

It is an objective of the present invention to provide a vehicle seat sliding device that allows for reduction in lateral backlash of a block body used to prevent entrapment of a foreign object that has entered rails.

In order to achieve the above described object, the present invention provides a vehicle seat sliding device including a lower rail adapted to be fixed to a vehicle floor and an upper rail adapted to be fixed to a vehicle seat. The lower rail includes a bottom wall, two side walls protruding upward from two opposite lateral sides of the bottom wall, a first end portion, and a second end portion opposite to the first end portion. The upper rail is coupled to be movable relative to the lower rail at an upper side of the lower rail. The seat sliding device further includes a projection arranged in the vicinity of the first end portion of the lower rail and protruding upward from the bottom wall, a fitting recess formed in the bottom wall at a location toward the second end portion of the lower rail from the projection, and a block body set on the bottom wall. The block body extends to at least the projection and includes a slanted surface provide at a location toward the second end portion from the projection. The slanted surface rises from the bottom wall as the first end portion becomes closer. The block body includes a fitting protrusion, which is fitted to the fitting recess to position the block body in a lateral direction, and a fitting wall, which is at least partially fitted to the projection to position the block body in the lateral direction.

According to the above described configuration, when the foreign object enters the lower rail at a location toward the second end portion from the block body, the movement of the upper rail in the direction toward the first end portion of the lower rail pushes and moves the foreign object with the upper rail thereby gradually lifting the foreign object along the slanted surface of the block body before reaching the projection. Accordingly, the foreign object passes over the projection. This limits the sandwiching of the foreign object between the upper rail and the projection. Further, the block body is positioned in the lateral direction at two positions separated from each other in the longitudinal direction of the lower rail by the fitting protrusion, which is fitted to the notched portion, and the fitting wall, which is at least partially fitted to the projection. This reduces backlash of the block body in the lateral direction. In addition, the fitting of the fitting wall and the projection impedes pivoting of the block body about the fitting protrusion, for example.

DETAILED DESCRIPTION OF THE PREFERRED EMBODIMENTS

Figure 1:
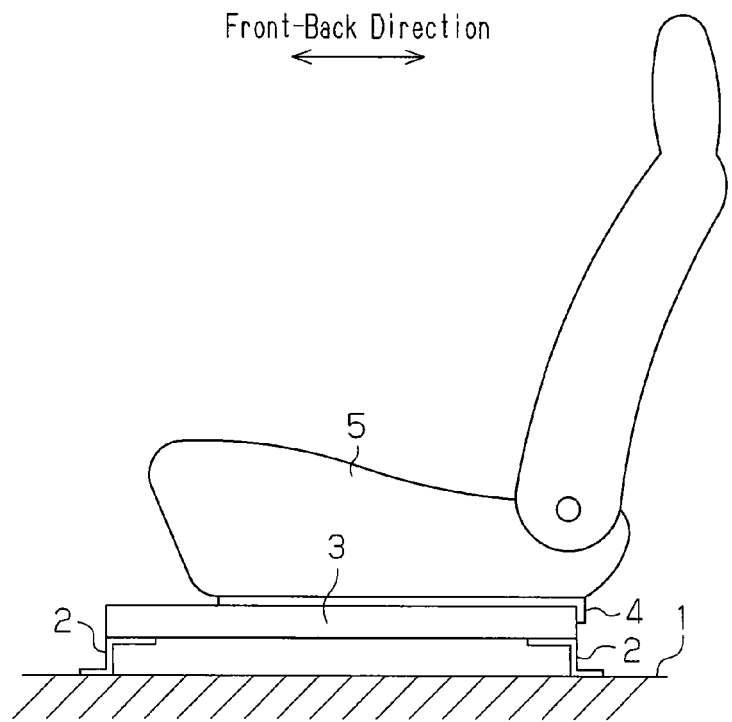
FIG. 1 is a side view illustrating a vehicle seat to which the present invention is applied.

One embodiment of the present invention will be described with reference to FIGS. 1 to 7. As shown in FIG. 1, a lower rail 3 is fixed to a vehicle floor 1 by two leg brackets 2, a front one and a rear one, such that the lower rail 3 extends in the front-back direction of a vehicle. An upper rail 4 is mounted on the lower rail 3 in a movable manner relative to the lower rail 3 in the front-back direction.

FIG. 1 shows one of two paired sets of the lower rail 3 and the upper rail 4. The two paired sets are spaced apart from each other in the lateral direction of the vehicle (direction perpendicular to the plane of FIG. 1). The left one of the paired sets extending toward the front is shown in FIG. 1. A seat 5 for seating a passenger is fixed to and supported by the two upper rails 4. The movement of the upper rails 4 relative to the lower rails 3 is normally restricted by a lock member (not shown). The restriction is released by applying an operating force to the lock member.

Figure 2:
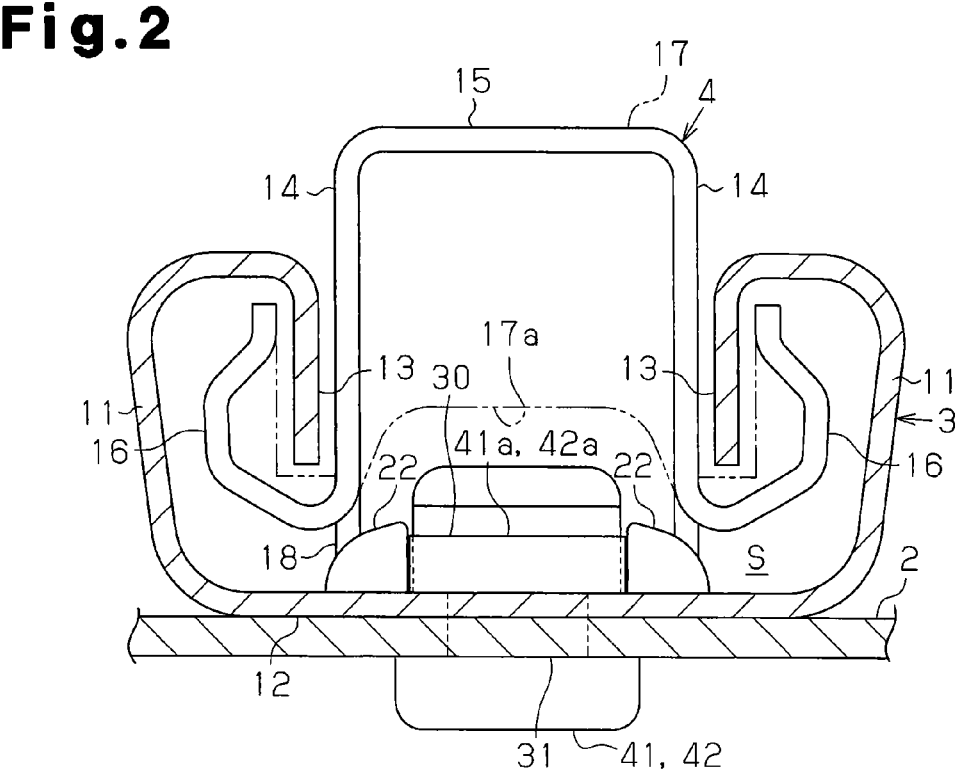
FIG. 2 is a horizontal cross-sectional view illustrating a seat sliding device according to an embodiment of the present invention.

As shown in FIG. 2, the lower rail 3 is formed by a plate and includes two first side walls 11, which are side walls projecting from the two lateral sides, and a bottom wall 12, which couples lower ends of the first side walls 11. A first folded wall 13 extends inward in the lateral direction from an upper end of each first side wall 11 and is further folded back toward the bottom wall 12 such that the first folded wall 13 is continuous with the first side wall 11. The lower rail 3 also includes a rear end portion, which serves as a first end portion, and a front end portion, which serves as a second end portion opposite to the rear end portion in the longitudinal direction.

The upper rail 4 is formed by a plate and includes two second side walls 14 and a cover wall 15 coupling the upper ends of the second side walls 14 to each other. The second side walls 14 extend in the vertical direction between the first folded walls 13 of the lower rail 3. A second folded wall 16, which extends outward in the lateral direction from the lower end of each second side wall 14, is further folded to be surrounded by the corresponding first side wall 11 and the corresponding first folded wall 13 such that the second folded wall 16 is continuous with the second side wall 14.

In this manner, the lower rail 3 and the upper rail 4 each have a substantially U-shaped cross-section and are engaged with each other such that their openings face each other. The engagement of the first folded wall 13 and the second folded wall 16 mainly restricts separation of the lower rail 3 and the upper rail 4 in the vertical direction. The lower rail 3 and the upper rail 4 form a rail cross-section that is substantially tetragonal and hollow. The lower rail 3 and the upper rail 4 cooperate to form an inner space S.

Figure 3:
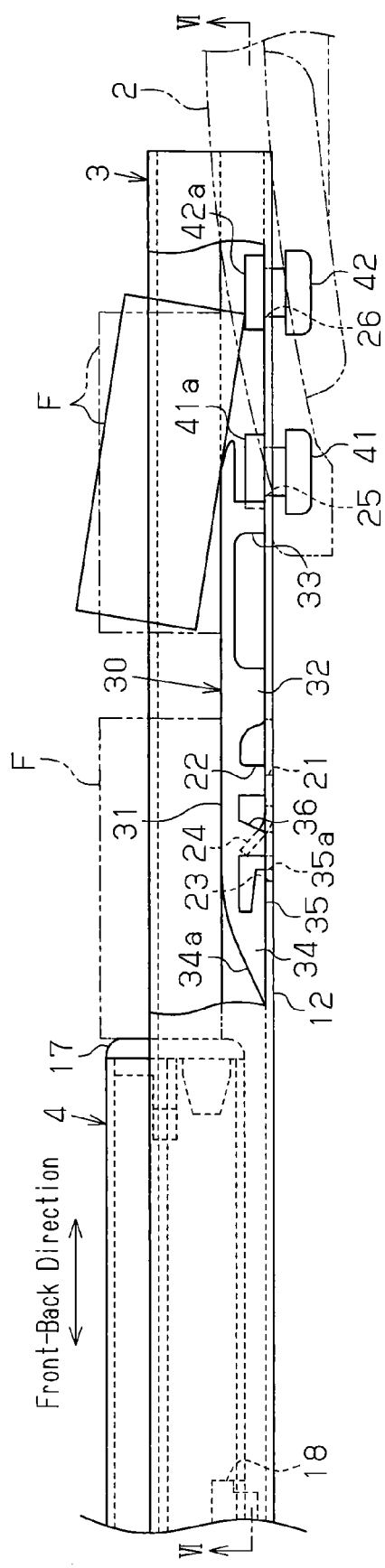
FIG. 3 is a partial side view illustrating the seat sliding device of FIG. 2.

Rollers (not shown) are arranged between each second folded wall 16 and the opposing first side wall 11 such that the upper rail 4 is supported to be slidable relative to the lower rail 3 in the longitudinal direction (front-back direction) as the rollers roll between the upper rail 4 and the lower rail 3. A cover member 17 made of plastic is attached to the rear end of the upper rail 4 such that the cover member 17 closes the rear opening of the upper rail 4. The cover member 17 includes an inlet 17a formed such that it is recessed upward from a lower end. The inlet 17a is open rearward. As shown in FIG. 3, a restriction member 18 is provided in a vicinity of the rear end portion of the upper rail 4.

Figure 4:
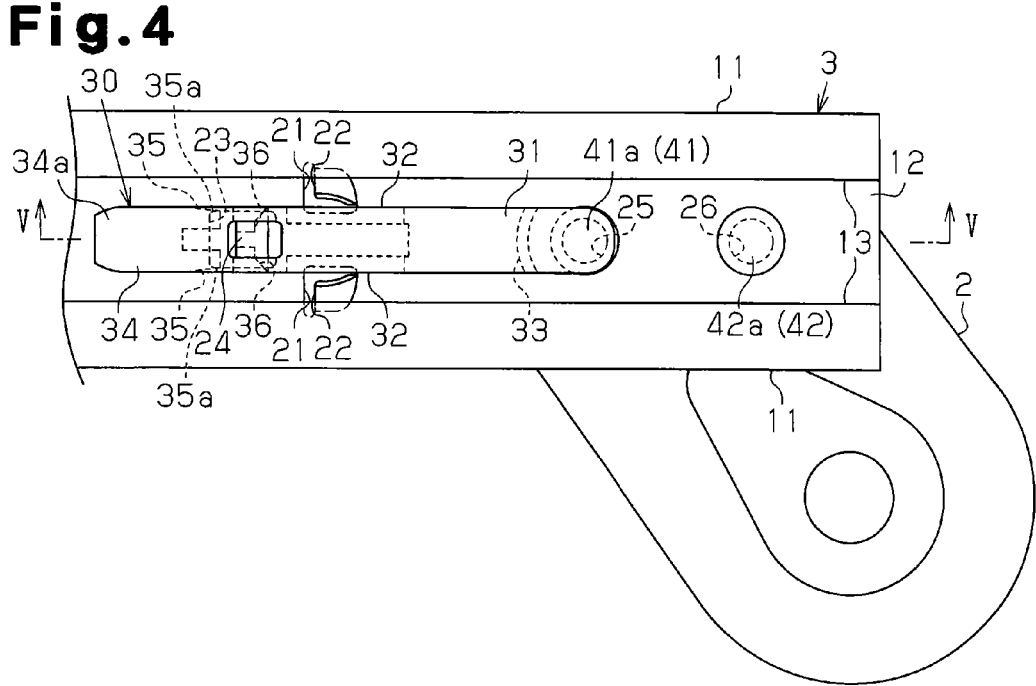
FIG. 4 is a partial plan view illustrating the seat sliding device of FIG. 2.

As shown in FIG. 4, in the vicinity of the rear end portion of the lower rail 3, the bottom wall 12 of the lower rail 3 includes two laterally symmetric notched portions 21, which are L-shaped as viewed from above and spaced apart from each other at the inner side of the first folded walls 13 in the lateral direction of the lower rail 3. A cut piece 22 is formed rearward of each notched portion 21 by bending a wall formed by each notched portion 21. As shown in FIG. 2, contours of the two cut pieces 22 are curved as viewed in the longitudinal direction of the lower rail 3 to approach each other at locations closer to their upper ends, that is, the cut pieces 22 curved to spread out wide. As shown in FIG. 3, when the upper rail 4 moves rearward, the restriction member 18 comes into contact with the cut pieces 22 so that the cut pieces 22 function as stoppers for restricting further rearward movement of the upper rail 4. In the present embodiment, when the upper rail 4 reaches the rear end of the lower rail 3, further rearward movement of the upper rail 4 is restricted.

Figure 5:
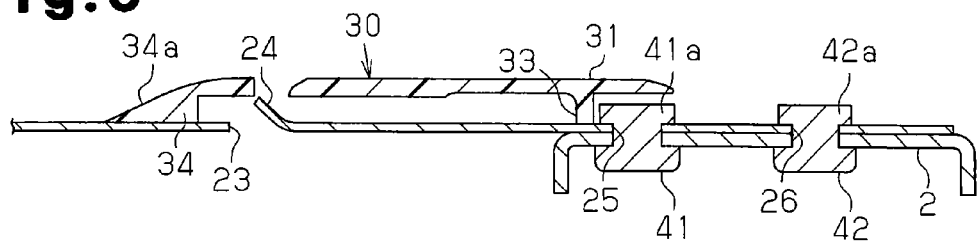
FIG. 5 is a cross-sectional view taken along line V-V of FIG. 4.

As shown in FIG. 4, the bottom wall 12 includes a notched portion 23, which serves as a fitting recess, formed in a laterally central portion of the bottom wall 12 at a location frontward from the two notched portions 21, that is, at a location toward the front end portion of the lower rail 3 from the two notched portions 21. The notched portion 23 is U-shaped and opens rearward as viewed from above. A wall formed by the notched portion 23 is bent to form a hook-shaped rail side engagement piece 24. As shown in FIG. 5, the rail side engagement piece 24 is cut out and bent from the bottom wall 12 to extend diagonally upward from its rear edge to rise with respect to the bottom wall 12 toward the front.

Further, a substantially circular first pin through-hole 25 is formed at a laterally central portion in the bottom wall 12 rearward from the cut pieces 22, and a substantially circular second pin though-hole 26 is formed in the bottom wall 12 rearward from the first pin through-hole 25. The bottom wall 12 (lower rail 3) is fastened to the leg bracket 2 by a first rivet 41 and a second rivet 42, which serve as fasteners that extend through the first pin through-hole 25 and the second pin through-hole 26 as well as the leg bracket 2. An upper head 41a of the first rivet 41 and an upper head 42a of the second rivet 42 correspond to projections, which protrude upward from the bottom wall 12. In particular, the head 42a of the second rivet 42 corresponds to a first head, which is the one of heads 41a and 42a of the rivets 41 and 42 that is closest to the rear end portion of the lower rail 3.

Figure 6:
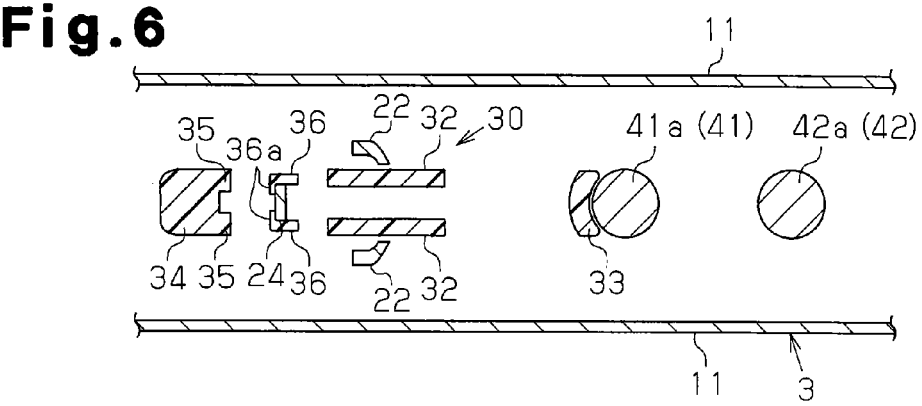
FIG. 6 is a cross-sectional view taken along line VI-VI of FIG. 3.

As shown in FIGS. 4 to 6, a block body 30 formed from a plastic material is fixed to the vicinity of the rear end portion of the lower rail 3. The block body 30 includes an elongated top plate 31, which extends in the longitudinal direction (front-back direction) of the lower rail 3 such that it is held between the cut pieces 22 in the lateral direction. The block body 30 also includes two legs 32, which extend downward from the two lateral edges of an intermediate portion of the top plate 31 in the longitudinal direction and are set on the bottom wall 12, and a fitting wall 33, which extends downward from the vicinity of the rear end portion of the top plate 31 and is set on the bottom wall 12. The fitting wall 33, which extends over the entire length of the top plate 31 in the lateral direction, is arcuate and protrudes forward as viewed from above. The fitting wall 33 includes a recessed fitting surface, which faces an outer circumferential surface of the head 41a of the first rivet 41 in the longitudinal direction of the block body 30 and may come into contact with the outer circumferential surface.

Figure 7:
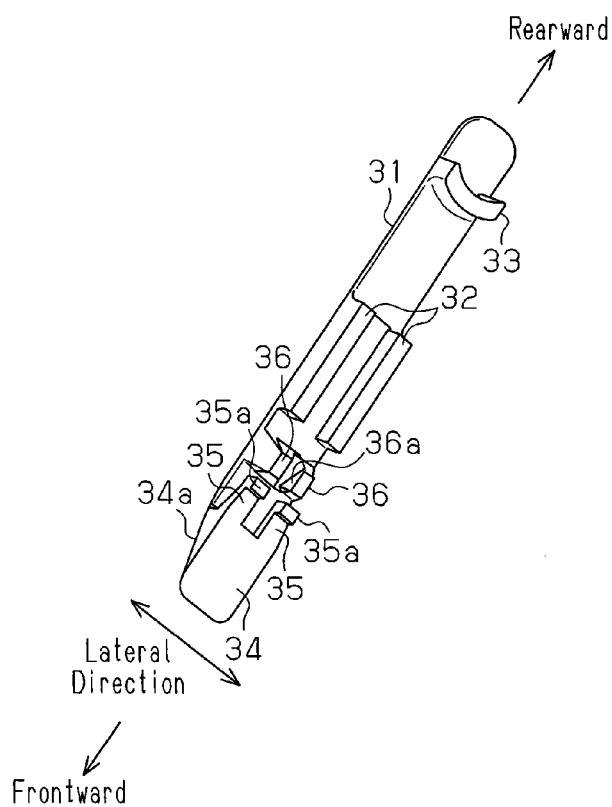
FIG. 7 is a perspective view illustrating a block body.

The front end of the top plate 31 is connected to a slide-shaped slanted portion 34. The slanted portion 34 includes a flat slanted surface 34a that rises from the bottom wall 12 toward the rear. As shown in FIG. 3, two extended walls 35, which extend rearward along a lower surface of the slanted portion 34, are arranged on the rear end of the slanted portion 34 in the lateral direction. As shown in FIG. 7, a substantially block-shaped fitting protrusion 35a, which protrudes downward, is formed on a rear end of each of the extended walls 35. The distance between outer side surfaces of the fitting protrusions 35a in the lateral direction is equivalent to an opening width of the notched portion 23 in the lateral direction. As shown in FIG. 4, when the block body 30 is set on the bottom wall 12, the fitting protrusions 35a fit into the two corners at the front end of the notched portion 23.

Further, as shown in FIG. 7, the block body 30 has two sandwiching walls 36, which protrude downward from the two lateral edges of the block body 30 between the legs 32 and the fitting protrusions 35a in the front-back direction. The distance between inner side surfaces of the sandwiching walls 36 is equivalent to the width of the rail side engagement piece 24. As shown in FIG. 6, when the block body 30 is set on the bottom wall 12, the sandwiching walls 36 sandwich the rail side engagement piece 24. As shown in FIG. 3, the lower end of each of the sandwiching walls 36 is arranged at a height equivalent to that of the lower end of each of the fitting protrusions 35a. When the block body 30 is set on the bottom wall 12, the lower end of each of the sandwiching walls 36 is inserted into the notched portion 23.

The fitting wall 33 is fitted to the front portion of the outer circumferential surface of the head 41a of the first rivet 41 when the block body 30 is set on the bottom wall 12. That is, the front end portion of the block body 30 is positioned in the lateral direction by the two fitting protrusions 35a, which are fitted into the notched portion 23, and the sandwiching walls 36, which sandwich the rail side engagement piece 24. Also, the rear end portion of the block body 30 is positioned in the lateral direction by the fitting wall 33, which is fitted to the head 41a of the first rivet 41. Simultaneously, the block body 30 is positioned in the front-back direction when sandwiched in the front-back direction by the front edge of the notched portion 23, with which the fitting protrusions 35a come into contact, and the front portion of the outer circumferential surface of the head 41a, with which the fitting wall 33 comes into contact.

As shown in FIG. 2, the contour of the block body 30 positioned on the bottom wall 12 and projected in the rail longitudinal direction (front-back direction of the upper rail 4) is shaped in conformance with the contour of the inlet 17a to avoid interference with the cover member 17. Thus, the block body 30 does not obstruct movement of the upper rail 4 relative to the lower rail 3. Further, as shown in FIG. 3, the two fitting protrusions 35a and the two sandwiching walls 36 fitted into the notched portion 23 are formed such that they do not protrude outward (below the bottom wall 12) from the U-shaped cross-section of the lower rail 3, that is, do not extend beyond the lower surface of the lower rail 3.

As shown in FIG. 7, substantially triangular prism-shaped block side engagement pieces 36a, which protrude toward each other, are formed on the sandwiching walls 36. Each of the block side engagement pieces 36a has a slanted angle equivalent to that of the rail side engagement piece 24. When the block body 30 is arranged on the bottom wall 12, the block side engagement pieces 36a are located below the rail side engagement piece 24 so that the block body 30 fixed to the bottom wall 12 holds the rail side engagement piece 24 from the bottom with the block side engagement pieces 36a. That is, the rail side engagement piece 24 is shaped to block the upward movement of the block side engagement pieces 36a (block body 30). Accordingly, the engagement of the two block side engagement pieces 36a with the rail side engagement piece 24 inhibits upward movement of the block body 30 with respect to the bottom wall 12 (lower rail 3).

When coupling the block body 30 to the bottom wall 12 (lower rail 3), the block body 30 is set on the bottom wall 12 under a situation in which the block side engagement pieces 36a are arranged frontward from the rail side engagement piece 24. Under this situation, the block body 30 is moved toward the rear with respect to the bottom wall 12 so that the two fitting protrusions 35a reach the front end of the notched portion 23. At this time, the block side engagement pieces 36a are arranged under the rail side engagement piece 24. When the block body 30 is then moved downward toward the bottom wall 12, the fitting protrusions 35a are fitted into the notched portion 23. Further, the sandwiching walls 36 sandwich the rail side engagement piece 24. Simultaneously, the fitting wall 33 is fitted to the head 41a of the first rivet 41. This positions the block body 30 with respect to the bottom wall 12 (lower rail 3) in the lateral direction and the front-back direction, and fixes the block body 30 to the lower rail 3. The block side engagement pieces 36a hold the rail side engagement piece 24 from the bottom. This inhibits the upward movement of the block body 30 with respect to the bottom wall 12.

Next, the operation of the present embodiment will be described.

As shown in FIG. 3, when a foreign object F, such as a lighter or a small object, enters the lower rail 3 in front of the block body 30, the rearward movement of the upper rail 4 (in the direction toward the rear end portion of the lower rail 3) pushes and moves the foreign object F with the cover member 17, which is attached to the rear end of the upper rail 4. This gradually lifts the foreign object F along the slanted surface 34a of the block body 30. Accordingly, the foreign object F is moved onto the top plate 31 and moved toward the rear on the top plate 31. Thus, the foreign object F passes over the front head 41a. If the rear end of the foreign object F has reached the rear head 42a when the gravity center of the foreign object F passes by the front head 41a, the foreign object F may also pass over the rear head 42a. This reduces the likelihood of entrapment of the foreign object F between the upper rail 4 (cover member 17) and the rivets 41 and 42.

As described above in detail, the above described embodiment has the following advantages.

(1) In the present embodiment, when a foreign object F enters the lower rail 3 in front of the block body 30, the rearward movement of the upper rail 4 pushes and moves the foreign object F with the upper rail 4 thereby gradually lifting the foreign object F along the slanted surface 34a of the block body 30 before reaching the heads 41a and 42a. Accordingly, the foreign object F passes over the heads 41a and 42a. This reduces the likelihood of entrapment of the foreign object F between the upper rail 4 and the heads 41a and 42a. Further, the block body 30 is positioned in the lateral direction at two positions separated from each other in the longitudinal direction of the lower rail 3 by the fitting protrusions 35a, which are fitted into the notched portion 23, and the fitting wall 33, which is at least partially fitted to the head 41a. This reduces backlash of the block body 30 in the lateral direction. This reduces the likelihood of situations in which the block body 30, which displaced in the lateral direction, interferes with the upper rail 4, which moves rearward. In addition, the fitting of the fitting wall 33 and the head 41a impedes pivoting of the block body 30 about the fitting protrusions 35a, for example.

(2) In the present embodiment, the bottom wall 12 (lower rail 3) is easily fixed to the vehicle floor 1 (leg bracket 2) when fastened with the first rivet 41. Further, entrapment of the foreign object F between the upper rail 4 and the head 41a of the first rivet 41 is limited.

(3) In the present embodiment, the engagement of the two block side engagement pieces 36a with the rail side engagement piece 24 impedes the upward movement of the block body 30 with respect to the bottom wall 12 (lower rail 3). This limits upward separation of the block body 30 from the bottom wall 12.

(4) In the present embodiment, the head 41a of the rivet 41 for fixing the bottom wall 12 (lower rail 3) to the vehicle floor 1 (leg bracket 2) is used to limit the backlash of the block body 30 in the lateral direction.

(5) In the present embodiment, the upper rail 4, which moves rearward, pushes the foreign object F, which has been moved over the head 41a, to the rear end of the lower rail 3. This discharges the foreign object F out of the lower rail 3.

(6) In the present embodiment, the block body 30 is shaped such that it does not protrude outward from the U-shaped cross-section of the lower rail 3 when the block body 30 is fixed to the lower rail 3. That is, the block body 30 is shaped to be fitted into the U-shaped cross-section. Accordingly, even if the surrounding components come into contact with the lower rail 3 in an inadvertent manner when assembling the seat sliding device or mounting the seat sliding device on the vehicle, for example, the surrounding components do not interfere with the block body 30. This restricts the separation of the block body 30 from the lower rail 3.

The above described embodiment may be modified as follows.

Figure 8:
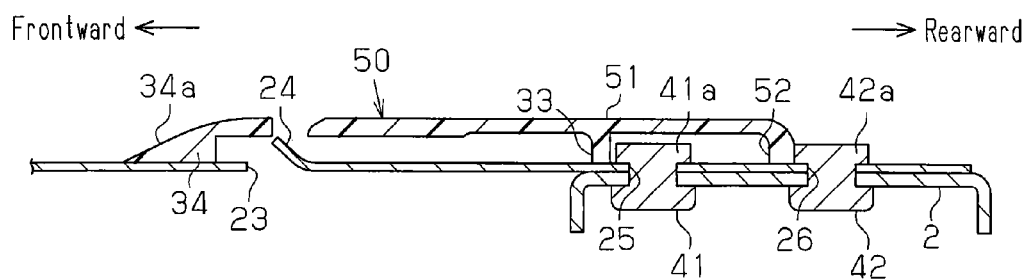
FIG. 8 is a vertical cross-sectional view illustrating a seat sliding device according to another embodiment of the present invention.

As shown in FIG. 8, a block body 50 including a top plate 51 may be adopted that covers the front head 41a and extends to the rear head 42a (head closest to the first end portion of the lower rail 3). The rear end portion of the top plate 51 is curved and lowered to a height equivalent to that of the head 42a such that it may be smoothly connected to the rear head 42a. In this case, when a foreign object F enters the lower rail 3 in front of the block body 50, rearward movement of the upper rail 4 pushes and moves the foreign object F over all of the heads 41a and 42a with the upper rail 4. This limits entrapment of the foreign object F between the upper rail 4 and any one of the heads 41a and 42a. Further, entrapment of the foreign object F between the adjacent heads 41a and 42a is also limited.

Further, the block body 50 may include a fitting wall 52 that is at least partially fitted to the rear head 42a. Such a configuration further reduces backlash of the block body 50 in the lateral direction. The fitting wall 52 may be omitted.

In the above described embodiment, the heads 41a and 42a may be shaped as a gradual peak, for example, so that the foreign object F does not easily hook to the heads 41a and 42a.

In the above described embodiment, a bolt and a nut may be adopted as a fastener in place of the first and the second rivets 41 and 42.

In the above described embodiment, the number of the fasteners (heads) used for fixing the bottom wall 12 (lower rail 3) to the vehicle floor 1 may be one, three, or more. In particular, when the number of the fasteners (heads) is three or more, it is preferable that the block body cover all the heads, except for the first head as a head that is closest to the end portion of the lower rail 3, and extend to the first head.

When the number of the fasteners (heads) is three or more, three or more of the fitting walls (33) may be arranged in correspondence with the fasteners and two of the fitting walls (33) may be arranged, for example, in correspondence with the frontmost and rearmost fasteners (heads).

In the above described embodiment, the projection, which protrudes upward from the bottom wall 12, may be an appropriate function member (or a part of the appropriate function member) other than the fastener (head).

In the above described embodiment, the fitting protrusions 35a may be fitted into a fitting recess (that is, a recessed portion, which does not extend through the bottom wall 12) formed in the bottom wall 12.

In the above described embodiment, the block body 30 may be inversed in the front-back direction and fixed in the vicinity of the front end portion of the lower rail 3.

In the above described embodiment, the cross-section formed by the lower rail 3 and the upper rail 4 does not have to be box-shaped. For example, the cross-section of the upper rail 4 may have an inverted T-shape.

In the above described embodiment, a single paired set of the lower rail 3 and the upper rail 4 (that is, the vehicle seat sliding device) may be used for the seat 5. Alternatively, three or more paired sets may be arranged for the seat 5.

In the above embodiment, the direction in which the seat is moved when the upper rail is moved relative to the lower rail may be the lateral direction of the seat, for example.

DESCRIPTION OF THE REFERENCE NUMERALS

1 . . . Vehicle Floor, 3 . . . Lower Rail, 4 . . . Upper Rail, 5 . . . Seat, 11 . . . First Side wall (Side wall), 12 . . . Bottom wall, 23 . . . Notched Portion (Fitting Recess), 24 . . . Rail Side Engagement Piece, 30 and 50 . . . Block Body, 31 and 51 . . . Top Plate, 33 and 52 . . . Fitting Wall, 34 . . . Slanted Portion, 34a . . . Slanted Surface, 35a . . . Fitting Protrusion, 36a . . . Block Side Engagement Pieces, 41 . . . First Rivet (Fastener), 41a . . . Head (Projection), 42 . . . Second Rivet (Fastener), and 42a . . . Head (Projection, or First Head).

The invention claimed is:

1. A vehicle seat sliding device comprising:
a lower rail adapted to be fixed to a vehicle floor, wherein the lower rail includes a bottom wall, two side walls protruding upward from two opposite lateral sides of the bottom wall, a first end portion, and a second end portion opposite to the first end portion;
an upper rail adapted to be fixed to a vehicle seat and coupled to be movable relative to the lower rail at an upper side of the lower rail;
a projection arranged in a vicinity of the first end portion of the lower rail, wherein the projection protrudes upward from the bottom wall;
a fitting recess formed in the bottom wall at a location toward the second end portion of the lower rail from the projection; and
a block body set on the bottom wall, wherein the block body extends to at least the projection and includes a slanted surface provide at a location toward the second end portion from the projection, and the slanted surface rises from the bottom wall as the first end portion becomes closer, and
the block body includes a fitting protrusion, which is fitted to the fitting recess to position the block body in a lateral direction, and a fitting wall, which is at least partially fitted to the projection to position the block body in the lateral direction.

2. The vehicle seat sliding device according to claim 1, wherein the projection includes a head of a fastener used to fix the bottom wall to the vehicle floor.

3. The vehicle seat sliding device according to claim 2, wherein
the fastener is one of a plurality of fasteners arranged in a longitudinal direction of the lower rail, and
the block body covers the head(s) of the fastener(s) except for a first head, which is the one of the heads of the fasteners closest to the first end portion of the lower rail, and the block body extends to the first head.

4. The vehicle seat sliding device according to claim 3, wherein the fitting wall is one of a plurality of fitting walls arranged in correspondence with the heads.

5. The vehicle seat sliding device according to claim 1, further comprising:
a block side engagement piece formed on the block body; and a rail side engagement piece that is cut and bent diagonally upward from the bottom wall to be shaped to block upward movement of the block side engagement piece.

6. The vehicle seat sliding device according to claim 5, wherein, when the block body is set on the bottom wall, the block side engagement piece is arranged at a lower side of the rail side engagement piece.

7. The vehicle seat sliding device according to claim 1, wherein, in a longitudinal direction of the lower rail, the fitting protrusion is fitted to the fitting recess and the fitting wall is fitted to the projection to position the block body in the longitudinal direction of the lower rail.

8. The vehicle seat sliding device according to claim 1, wherein the fitting wall includes a recessed fitting surface that may come into contact with an outer circumferential portion of the projection.

* * * * *